(12) United States Patent
Barrass (10) Patent No.: US 11,121,631 B2
(45) Date of Patent: Sep. 14, 2021

(54) DC-DC CONVERTER (71) Applicant: Sevcon Limited, Gateshead (GB)

(72) Inventor: Peter Barrass, Gateshead (GB)

(73) Assignee: Sevcon Limited, Gateshead (GB)

( * ) Notice: Subject to any disclaimer, the term of this patent is extended or adjusted under 35 U.S.C. 154(b) by 0 days.

(21) Appl. No.: 16/605,930

(22) PCT Filed: Apr. 19, 2018

(86) PCT No.: PCT/GB2018/051040
§ 371 (c)(1),
(2) Date: Oct. 17, 2019

(87) PCT Pub. No.: WO2018/193266
PCT Pub. Date: Oct. 25, 2018

(65) Prior Publication Data
US 2020/0044567 A1 Feb. 6, 2020

(30) Foreign Application Priority Data

Apr. 19, 2017 (GB) ..................................... 1706206

(51) Int. Cl.
*B60L 15/00* (2006.01)
*H02M 3/158* (2006.01)
*H02P 27/06* (2006.01)

(52) U.S. Cl.
CPC ........... *H02M 3/1582* (2013.01); *H02P 27/06* (2013.01)

(58) Field of Classification Search
CPC ...... H02M 3/1582; H02P 27/06; B60L 15/007
See application file for complete search history.

(56) References Cited

U.S. PATENT DOCUMENTS

| 4,920,475 A | 4/1990 | Rippel et al. |
| 2012/0163035 A1* | 6/2012 | Song ................ H02M 3/33584 363/17 |
| 2015/0191133 A1* | 7/2015 | Okamura ............. B60L 15/007 307/9.1 |
| 2016/0236579 A1 | 8/2016 | Yim et al. |

FOREIGN PATENT DOCUMENTS

| DE | 10 2016 209905 A1 | 12/2016 |
| EP | 2765022 A2 | 8/2014 |
| EP | 3238979 A1 | 11/2017 |

OTHER PUBLICATIONS

GB Search Report for GB1706206.8 dated Nov. 3, 2017.
International Search Report and Written Opinion dated Apr. 19, 2017 for PCT/GB2018/051040.

* cited by examiner

*Primary Examiner* — Cortez M Cook
(74) *Attorney, Agent, or Firm* — Woodard Emhardt Henry Reeves & Wagner LLP (57) ABSTRACT

ADC-to-DC converter which is configured to provide a main DC supply and an auxiliary DC supply from a single energy source such as a fuel cell. The main supply voltage may be greater than the voltage provided by the energy source, and the auxiliary supply voltage may be less than the voltage provided by the energy source. In some embodiments boost and buck conversion are provided by a single switching bridge, such as an inverter. Such an inverter may comprise three-legs connected between a main output voltage and a reference or ground voltage. Each leg of such an inverter may comprise two switches connected in series. These legs may share a common DC voltage link, for example a common ground and positive rail.

20 Claims, 5 Drawing Sheets

DC-DC CONVERTER

FIELD OF INVENTION

The present invention relates to apparatus and methods, and more particularly to apparatus and methods for direct current (DC) to DC conversion, for example for providing electrical power supplies.

BACKGROUND

A DC-to-DC converter converts a source of DC electrical energy from one voltage level to another. Typically, so called boost converters provide an output voltage which is greater than the voltage of the source. On the other hand, so called buck converters provide an output voltage which is less than the voltage of the source.

Electrical and electronic devices often contain several sub-circuits, each with its own voltage level requirement different from that supplied by the source. As energy is drained from the source, or it is recharged, the voltage it provides may vary. Typically, electrical and electronic circuits may require power supply voltages within a selected range.

Hybrid and electrical vehicles are increasingly prevalent. Both on-highway and off-highway vehicles may make complex demands of an electrical power supply.

SUMMARY

Aspects and examples of the present disclosure are set out in the claims and are otherwise described herein. The present disclosure aims to address at least a part of the above technical problem.

Embodiments aim to reduce the number and weight of electrical and/or electronic components required to provide DC-DC power conversion. Some embodiments are of particular utility in systems which use a fuel cell as their DC energy source.

Some embodiments employ an electric motor inverter adapted to provide the switching phases of a DC-to-DC converter. Such an inverter may be suitable for providing electrical power to drive a traction motor for an off-highway vehicle, for example a materials handling vehicle such as a lift truck.

An embodiment of the disclosure comprises a materials handling vehicle such as a lift truck. Such a vehicle may comprise a main power supply circuit arranged to provide DC power to a lifting unit which provides lifting force to a load bearing lift, or to other traction functions of the vehicle, and an auxiliary power supply circuit arranged to provide DC power to components carried by the vehicle and at lower voltage than the main power supply circuit. The vehicle may carry an energy store, such as a fuel cell, adapted to provide DC electrical power. The vehicle comprises an inverter, such as a three-phase inverter suitable for powering an AC traction motor, and a controller configured to operate the inverter, and to:

obtain a first difference signal indicating a boost voltage difference between a target boost voltage and a DC voltage across the inverter, wherein the DC voltage across the inverter is connected to a boost output to provide DC electrical power to the main power supply circuit;

determine a target current to be provided to a capacitor connected across the inverter to reduce the first voltage difference;

operate a first boost leg of the inverter to reduce a first current difference between:
(i) the target current $I_1^{Ref}$; and
(ii) current, $I_1$, flowing between a first input inductor and a mid-connection of a first boost leg of the inverter;

and, to operate a buck leg of the inverter to reduce a buck voltage difference between:
(i) a target buck voltage; and
(ii) a voltage at a buck output of the converter, wherein the buck output is arranged to provide DC electrical power to the auxiliary power circuit and is coupled to a mid-connection of a buck leg of the inverter by a first output inductor.

Some embodiments of the disclosure provide a DC-to-DC converter which is configured to provide a main DC supply and an auxiliary DC supply from a single energy source such as a fuel cell. The main supply voltage may be greater than the voltage provided by the energy source, and the auxiliary supply voltage may be less than the voltage provided by the energy source. In some embodiments boost and buck conversion are provided by a single switching bridge, such as an inverter. Such an inverter may comprise three-legs connected between a main output voltage and a reference or ground voltage. Each leg of such an inverter may comprise two switches connected in series. These legs may share a common DC voltage link, for example a common ground and positive rail.

An aspect of the disclosure provides a method of controlling an inverter apparatus to provide a DC-to-DC converter. This method comprises obtaining a first difference signal indicating a boost voltage difference between a target boost voltage, $V_b^{Ref}$, and a DC voltage across the inverter $V_b$; determining a target current $I_1^{Ref}$ to be provided from a first boost leg of the inverter to a capacitor connected across the inverter to reduce the first voltage difference; and operating the first boost leg of the inverter to reduce the difference between:
(i) the target current $I_1^{Ref}$; and
(ii) current $I_1$ flowing between a first input inductor and a mid-connection of a first boost leg of the inverter.

The first input inductor may be coupled between a DC supply input and the mid-connection of the first boost leg. The mid-connection may be connected by a first switching element to a ground or reference link of the inverter, and by a second switching element to a DC link of the inverter (e.g. the DC link provides an output voltage coupling from the inverter).

A second input inductor may couple a mid-connection of a second boost leg of the inverter to the DC supply input. In these embodiments the method may comprise determining a second target current $I_2^{Ref}$ to be provided from the second boost leg of the inverter to the capacitor to reduce the first voltage difference; and operating the second boost leg of the inverter to reduce the difference between:
(i) the target current $I_2^{Ref}$; and
(ii) current $I_2$ flowing between the second input inductor and a mid-connection of a second boost leg of the inverter.

The converter may comprise a buck output for providing a buck output voltage (e.g. a voltage which is less than the DC supply voltage provided to the converter input). The buck output may be coupled to a mid-connection of a buck leg of the inverter by a first output inductor.

The method may comprise determining a buck voltage difference between a target buck voltage and a voltage at the buck output; and operating the buck leg of the inverter to reduce the buck voltage difference. This may comprise determining a target buck current $I_3^{Ref}$ to be provided in the first output inductor to reduce the buck voltage difference.

This may comprise operating the buck leg to reduce the difference between (i) the target buck current $I_3^{Ref}$; and (ii) current $I_3$ flowing between the first output inductor and the mid-connection of the buck leg of the inverter.

Embodiments of the disclosure provide a computer program product comprising program instructions configured to program a programmable controller to perform these methods. Embodiments of the disclosure also provide a controller for controlling an inverter, wherein the controller is configured to perform these methods.

The legs may be provided by the phases of a multi-phase electric motor inverter (e.g. a three-phase inverter).

Accordingly, an aspect the invention is a method of using a three-phase electric motor inverter to provide a buck-boost DC-DC converter.

This use may comprise: coupling the electric motor inverter to an input inductive energy store, a capacitive energy store, and a reference voltage connection, and operating a first phase of the electric motor inverter to provide a boost stage of the DC-DC converter. The use may also comprise operating a second phase of the electric motor inverter to contribute to the boost stage.

The use may comprise operating the boost stage based on a boost voltage difference between:

(i) a boost target voltage; and (ii) a DC voltage across the boost stage.

The use may also comprise operating a third phase of the inverter to provide a buck stage of the DC-DC converter.

BRIEF DESCRIPTION OF DRAWINGS

Embodiments of the disclosure will now be described, by way of example only, with reference to the accompanying drawings, in which.

In the drawings like reference numerals are used to indicate like elements.

SPECIFIC DESCRIPTION

Figure 1:
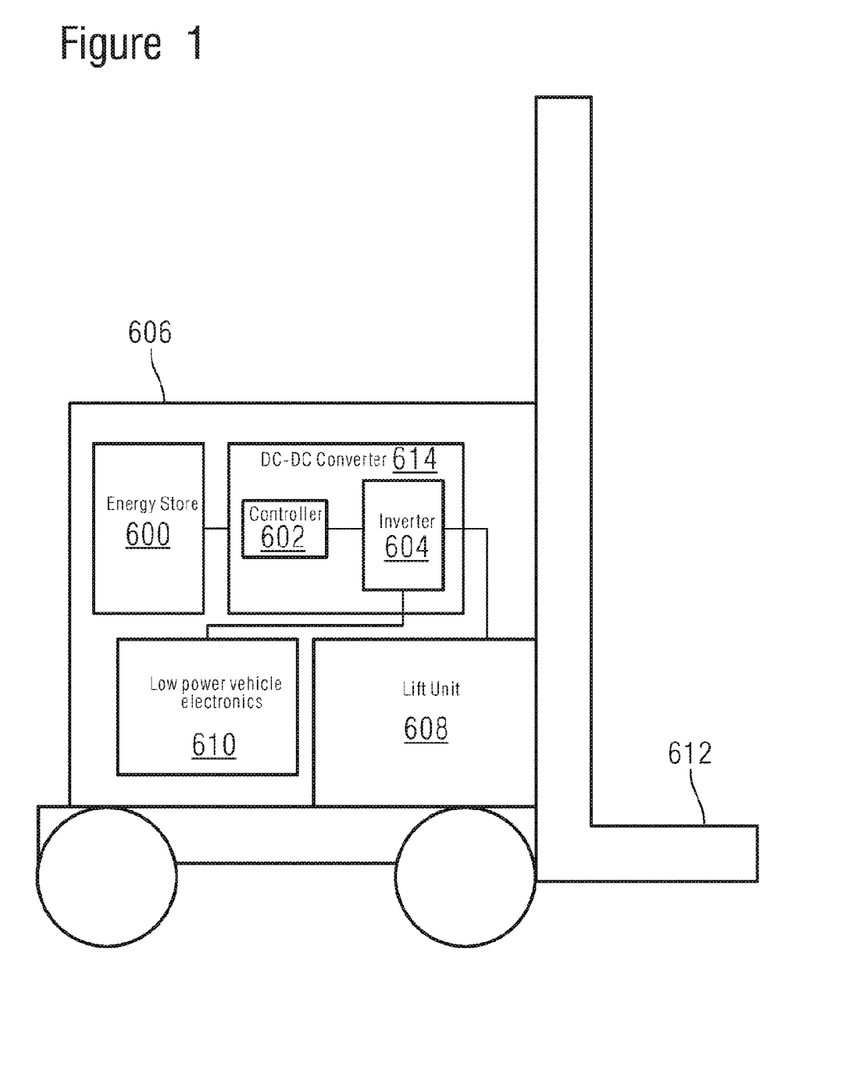
FIG. 1 shows an off-highway vehicle comprising a DC power supply.

FIG. 1 shows an off-highway vehicle 606. The vehicle 606 illustrated in FIG. 1 is a lift truck, having a load bearing lift 612 for performing materials handling functions.

The vehicle 606 also comprises an energy source 600 such as a fuel cell, and a lifting unit 608 for providing lifting force to the lift 612, and auxiliary electronic systems 610 which require a lower voltage DC power supply than the lifting unit 608, and which share a common ground connection with the lifting unit 608.

The vehicle may include other low power systems, such as human interfaces, vehicle control circuitry, lights, on-board communications and other low voltage systems. Typically these low power systems are galvanically isolated from the lifting unit 608, and from the auxiliary electronic systems 610.

The vehicle 606 also comprises DC-DC converter 614 comprising an inverter 604 and a controller 602 configured to operate the inverter 604 to provide: (i) a main power supply for supplying DC power to a main load 608 such as the lift unit 608; and (ii) an auxiliary power supply for an auxiliary load such as the (lower voltage) auxiliary electronic systems 610. It will be appreciated in the context of the present disclosure that the energy store 600 may also provide power to a traction motor of the vehicle. The vehicle may also comprise a second energy store, such as a capacitor or battery, that can accept energy regenerated electrical energy (regenerative brake energy) produced by the lift when lowering a load, or by the traction motor when braking.

The energy source 600 is coupled to the DC-DC converter 614, and the DC-DC converter 614 is coupled to convert DC electrical energy provided by the energy source to provide DC electrical power for the main load 608 and for the auxiliary load 612.

One example of a DC-DC converter 614 for use in the vehicle illustrated in FIG. 1 will now be described with reference to FIG. 2A and FIG. 2B.

Figure 2A:
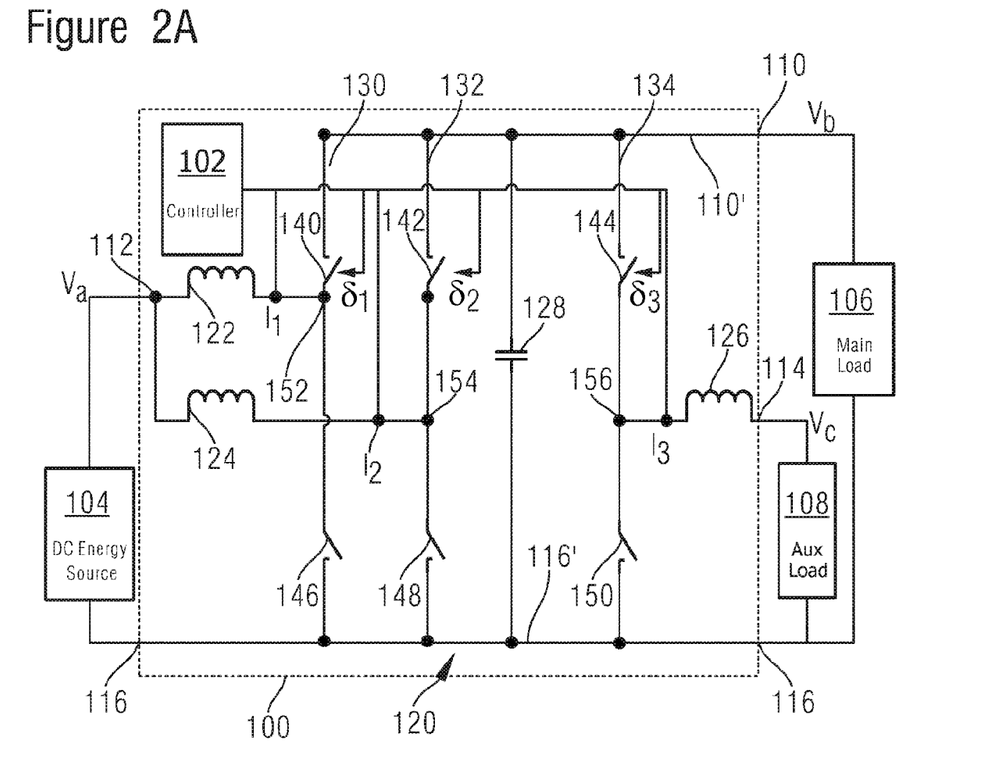
FIG. 2A shows an apparatus comprising a DC-to-DC converter for use in a power supply such as that illustrated in FIG. 1.

FIG. 2A shows an apparatus comprising a DC-to-DC converter 100 for coupling to a DC energy source such as a fuel cell, a first load 106, and a second load 108.

The converter 100 comprises an input 112, a main output 110, an auxiliary output 114, a reference voltage input/output 116, and a controller 102.

The DC energy source 104 is connected between the input of the DC-to-DC converter 100 and the reference voltage input/output 116. The first load 106 is connected between the main output 110 of the converter 100 and the reference voltage input/output 116. The second load 108 is connected between the auxiliary output 114 of the converter 100 and the reference voltage input/output 116. The DC energy source 104 is operable to provide an input voltage $V_a$ at the input of the converter 100.

The converter 100 comprises a switching bridge 120, a first inductor 122, a second inductor 124, a third inductor 126, and a capacitor 128. The converter 100 also comprises a main voltage coupling 110' connected to the main output 110, and a reference voltage coupling 116' for connection to the reference voltage input/output 116.

The main voltage coupling 110' and the reference voltage coupling 116' are connected by the capacitor 128. The switching bridge includes three legs 130, 132, 134 connected in parallel with the capacitor 128 between the main output voltage coupling 110 and the reference voltage coupling 116. Each leg comprises a first switching element 140, 142, 144 a second switching element 146, 148, 150, and a mid-connection 152, 154, 156 for connecting to an input or output of the leg. The first switching element 140, 142, 144 in each leg is connected between the mid-connection 152, 154, 156 and the output voltage coupling 110'. The second switching element 146, 148, 150, in each leg is connected between the reference voltage coupling 116' and the mid-connection 152, 154, 156. In each leg, the two switching elements may be arranged to be driven in opposition to each other. For example, when the first switching element is closed (on), the other is off (open) and vice versa.

The mid-connection 152 of the first leg 130 is connected to the input 112 of the converter 100 by a first inductance 122. The mid-connection 154 of the second leg 132 is connected to the input 112 of the converter 100 by a second inductance 124. The mid-connection 156 of the third leg 134 is connected to the auxiliary output 114 of the converter 100 by the third inductor 126.

The first inductor 122, the second inductor 124, and the third inductor 126 are operable to store electrical energy in a magnetic field associated with the passage of current through them. The first inductor 122 is operable to provide a first current $I_1$ to the mid-connection 152 of the first leg 130 by drawing current from the converter input 112 in response to operation of the switching elements 140, 146 of the first leg. The second inductor 124 is operable to provide a second current $I_2$ to the mid-connection 154 of the second leg by drawing current from the converter input 112 in response to operation of the switching elements 142, 148 of the second leg of the switching bridge 120. The first and second inductors 122, 124 thereby act as an inductive energy store for a boost stage of the DC-to-DC-converter 100 illustrated in FIG. 2A. And, the first leg 130 and the second leg 132 of the switching bridge 120 thus provide a boost stage switch—e.g. the switching function of a boost stage of the converter 100. By operation of the boost stage switches 140, 142, 146, 148 the converter 100 can provide the main output voltage $V_b$ for supply to the main load 106 via the main output of the converter 100.

The third inductor 126 is operable to draw a third current $I_3$ from the mid-connection 156 of the third leg 134 by drawing current from the main output voltage coupling 110' in response to operation of the switching elements 144, 150 of the third leg. The third inductor is operable to provide an auxiliary output voltage $V_c$ at the converter's auxiliary output.

The controller 102 is coupled to control the switching elements of the switching bridge 120, and to sense the currents $I_1$, $I_2$, and $I_3$. The controller 102 is also coupled to sense the voltages $V_a$, $V_b$, and $V_c$. In the interests of clarity in the drawings, not all of the control and sensing couplings of the controller 102 are shown. The controller 102 is configured to provide:

(i) a first control signal $\delta_1$ to the first switching element 140 of the first leg 130;
(ii) a second control signal $\delta_2$ to the first switching element 142 of the second leg 132;
(iii) a third control signal $\delta_3$ to the first switching element 144 of the third leg 134;

The controller 102 may be configured to provide the inverse of the control signals $\delta_1$, $\delta_2$, $\delta_3$ to the second switching element of the first leg, the second leg, and the third leg respectively. It will thus be understood that the first switching element of each leg may be driven in opposition to the second switching element of that leg. The control signals $\delta_1, \delta_2, \delta_3$ may comprise pulse width modulated control signals. In some embodiments, the controller is arranged to control only the first switching element or only the second switching element of each leg and keep the other in an off-state (or optionally to replace it altogether with a freewheel diode)

Figure 2B:
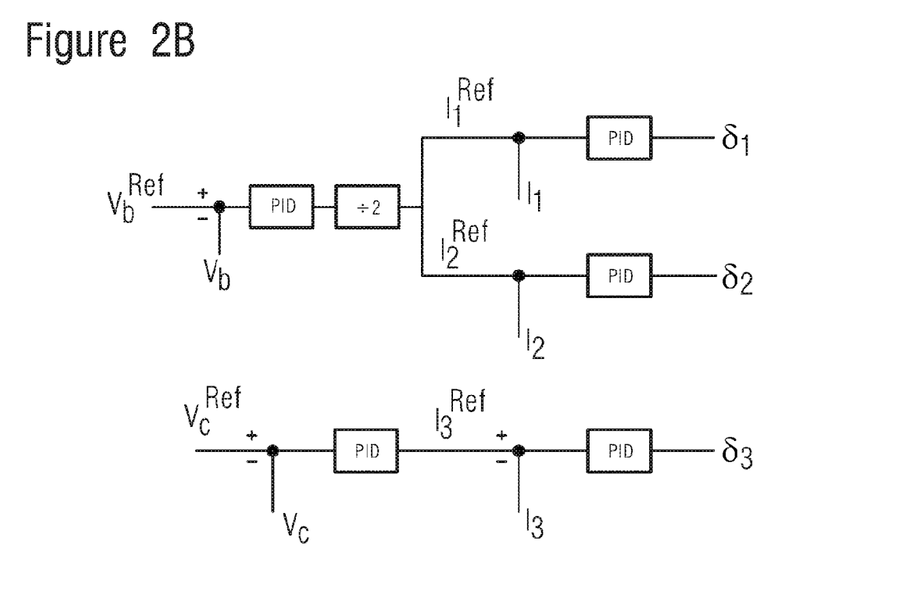
FIG. 2B illustrates a control scheme for converters such as those illustrated in FIG. 2A.

In operation, the controller 102 implements the control loops illustrated in FIG. 2BB. This may be done using analogue or digital control. In a digital control scheme, in each of a series of clock cycles the controller 102 implements the control scheme illustrated by the two control loops illustrated in FIG. 2B. In the first control loop the controller 102 senses the voltage $V_b$ and determines the difference between $V_b$ and a first target voltage $V_b^{Ref}$. Based on this difference it determines the target current which needs to be provided into the capacitor to reduce that difference (e.g. to null the measured error between the actual and target $V_b$). This may be done using a proportional-integral-derivative (PID) controller or other appropriate control element. The controller 102 then adjusts this target current to provide a leg target current $I_1^{Ref}$, $I_2^{Ref}$ (the target current to be drawn from each leg) based on the number of switching legs in the boost stage—for example, by dividing it by two. The controller 102 then determines the difference between the current $I_1$ from the first inductor and the leg target current $I_1^{Ref}$. It then determines the control signal $\delta_1$ that needs to be applied to the switching elements of the first leg to reduce this difference (e.g. to null the measured error between the actual and target $I_1$). This may be done using a PID controller or other appropriate control element. The controller 102 then applies the control signal $\delta_1$ to the switching elements of the first leg.

In the first control loop the controller 102 also determines the difference between the current $I_2$ from the second inductor and the leg target current. It then determines the control signal $\delta_2$ that needs to be applied to the switching elements of the second leg to reduce this difference (e.g. to null the measured error between the actual current $I_2$ and the target current $I_3^{Ref}$). This may be done using a further PID controller or other appropriate control element. The controller 102 then applies the control signal $\delta_2$ to the switching elements of the second leg.

In the second control loop, the controller 102 senses the voltage $V_c$ and determines the difference between $V_c$ and a second target voltage $V_c^{Ref}$. Based on this difference it determines the target current, $I_3^{Ref}$, which needs to be provided into the third inductor to reduce that difference (e.g. to null the measured error between the actual $V_c$ and the target $V_c^{Ref}$). This may be done using another PID controller or other appropriate control element. It then senses the actual current $I_3$ being provided to the third inductor and determines the difference between this actual current $I_3$ and the target current $I_3^{Ref}$. It then determines the control signal $\delta_3$ that needs to be applied to the switching elements of the third leg to reduce this difference (e.g. to null the measured error between the actual and target $I_3$). The controller 102 then applies the control signal $\delta_3$ to the switching elements of the third leg.

The controller 102 operates the two control loops concurrently (e.g. in a series of concurrent iterations) to control the voltages $V_b$ and $V_c$ to match the target voltages $V_b^{Ref}$ and $V_c^{Ref}$ respectively.

In the illustration of FIG. 2A, the boost stage switch comprises two switching legs, so the controller 102 divides this target current by two. If a greater or lesser number of switching legs are present in the boost stage the target current can be scaled by that number instead.

The switching elements described herein may be provided by any switching element which is operable to be controlled by a control signal. Examples of such switching elements include signal controlled impedances such as voltage or current controlled impedances. Transistors are one example of such a switching element for example insulated gate bipolar transistors, IGBTs, field effect transistors, FETs, such as junction field effect transistors, JFETS, insulated gate field effect transistors, IGFETS, metal oxide semiconductor field effect transistors, MOSFETs, reverse conducting IGBTs, SiC JFETs, and any other type of signal controlled impedance which may be operated as a switch.

These switching elements may be driven in opposition to each other—for example, the logical inverse of the control signal which is applied to the first switching element of the leg may be applied to the other switching element of the leg. One way to achieve this is to use the same control signal to both but to include an inverter (e.g. a NOT gate) in one of the switching elements.

Figure 3:
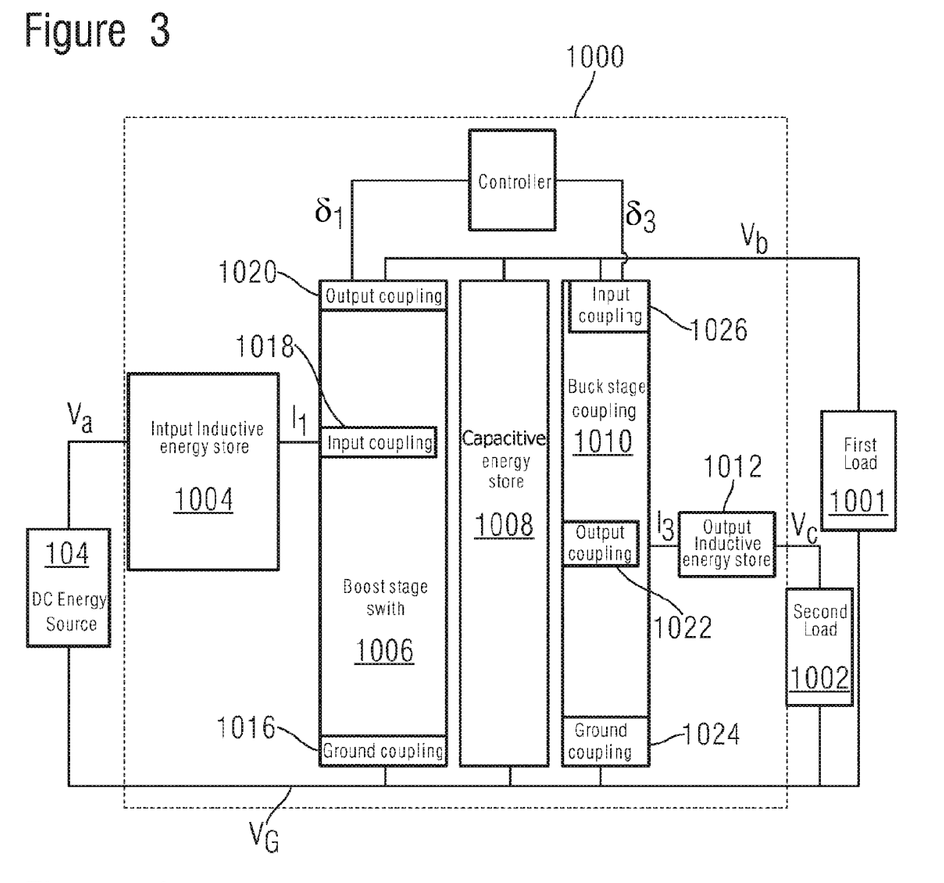
FIG. 3 shows apparatus comprising another DC-to-DC converter.

FIG. 3 shows an apparatus comprising a DC-to-DC converter 1000, a DC energy source 104, a first load 1001, and a first load 1002.

The DC energy source 104 is connected to an input of the DC-to-DC converter 1000, the first load 1001 is connected to a main output Vb of the converter 1000, and the first load 1002 is connected to an auxiliary output Vc of the converter.

The converter 1000 comprises an input inductive energy store 1004, a boost stage switch 1006, a capacitive energy store 1008, a buck stage switch 1010, and an output inductive energy store 1012.

The boost stage switch 1006, the capacitive energy store 1008 and the buck stage switch 1010 are connected together in parallel between a main voltage output supply Vb, and a reference voltage Vg such as a ground.

The boost stage switch 1006 comprises three switch couplings: a ground coupling 1016 connected to the reference voltage Vg; an input coupling 1018 connected to the input inductive energy store 1004; and an output coupling 1020 connected to the voltage output supply Vb. The boost stage switch 1006 is operable to connect its input coupling 1018 to either its output coupling 1020, or to the ground coupling Vg.

The boost stage switch 1006 may be configured so that when the input coupling 1018 is connected to the output coupling 1020, it provides high impedance (e.g. an off state) between the input coupling 1018 and the ground coupling 1016 (when in the off state it may carry current in a freewheel or reverse conduction path). The converse is also true—that is to say when the input coupling is connected to the ground coupling, the boost stage switch provides high impedance (e.g. an off state) between the input coupling and the output coupling (when in the off state it may carry current in a freewheel or reverse conduction path). It will thus be appreciated that the boost stage switch 1006 may provide the function of a single pole double throw switch with a freewheel or reverse conduction path through whichever side of the switch is in an off state. This functionality may be implemented by two switching elements connected together in series, one between the output coupling 1020 and the input coupling 1018, and another between the input coupling 1018 and the ground coupling 1016. These two switching elements may be driven in opposition (when one is open, the other is closed, and vice versa). These switching elements may be provided by voltage controlled impedances (such as transistors) driven in opposition. It will be appreciated that to drive such elements in opposition, the inverse of the control signal applied to one is applied to the other. The switching elements may comprise diodes (e.g. inherent diodes, or an additional diode component connected in parallel) to provide a reverse conduction path through the switching element. Such functionality may be provided by a leg (also known as a 'switching leg', a 'phase' or 'phase leg') of an inverter, such as the type of inverter used for powering electric traction motors, such as traction motors for passenger transport vehicles.

The input inductive energy store 1004 is connected between the input Va of the DC-to-DC converter 1000 (e.g. for connection to the DC energy source 104), and to the input coupling 1018 of the boost stage switch. The input inductive energy store 1004 comprises a reactive impedance, which may be predominantly inductive. The input inductive energy store is operable to store electrical energy (e.g. in the form of a magnetic field).

The first load 1001 can be connected between the output coupling of the boost stage switch 1020 and the reference voltage Vg.

The buck stage switch 1010 comprises three switch couplings: a ground coupling 1024 connected to the reference voltage Vg; an output coupling 1022 connected to the output inductive energy store 1012; and an input coupling 1026 connected to the voltage output supply Vb. The second load 1002 can be connected between the output of the output inductive energy store 1012 and the reference voltage Vg.

The output inductive energy store comprises a reactive impedance, which may be predominantly inductive. The output inductive energy store is operable to store electrical energy (e.g. in the form of a magnetic field).

Figure 4:
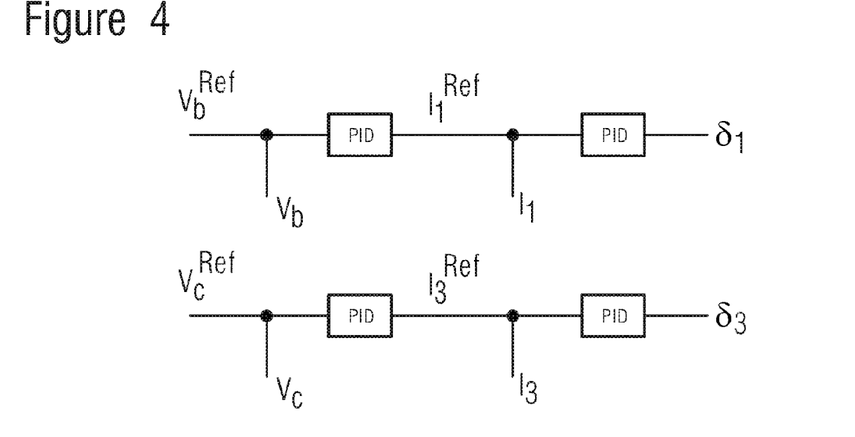
FIG. 4 illustrates a control scheme for converters such as those illustrated in FIG. 3.

FIG. 4 shows two control loops suitable for the operation of the apparatus of FIG. 3. These operate in the same manner as the control loops in FIG. 2B. It will be appreciated however that the arrangement of FIG. 3 may provide a single phase boost. The boost stage switch however may also be arranged to provide a multiphase boost (e.g. two or more phases) in which case the inductive energy store typically comprises one energy store for each boost phase.

The DC energy sources described herein may comprise a device that converts chemical energy from a fuel into DC electricity, such as a fuel cell. Examples of such fuel cells may provide DC electricity through a chemical reaction of hydrogen ions with oxygen or another oxidizing agent. The DC energy source 104 may comprise a battery and/or a super capacitor and may be rechargeable. As an alternative, or in addition, the DC energy source 104 may also comprise from other sources—e.g. the output of an AC to DC converter connected to a generator or to the AC mains.

The first load 1001 may have higher voltage requirements than the first load 1002. For example, the first load 1001 may comprise the power electronics and motor of a vehicle. The first load 1002 may comprise auxiliary vehicle systems such as human interface devices, lights, control electronics and other relatively low voltage vehicle systems.

Another example of a DC power supply system for use in the vehicle illustrated in FIG. 1 will now be described with reference to FIG. 5 and FIG. 6. The topology illustrated in FIG. 5 can provide two output voltages $V_b$, $V_c$ each of which may be greater than or less than the voltage of the DC source $V_a$.

Figure 5:
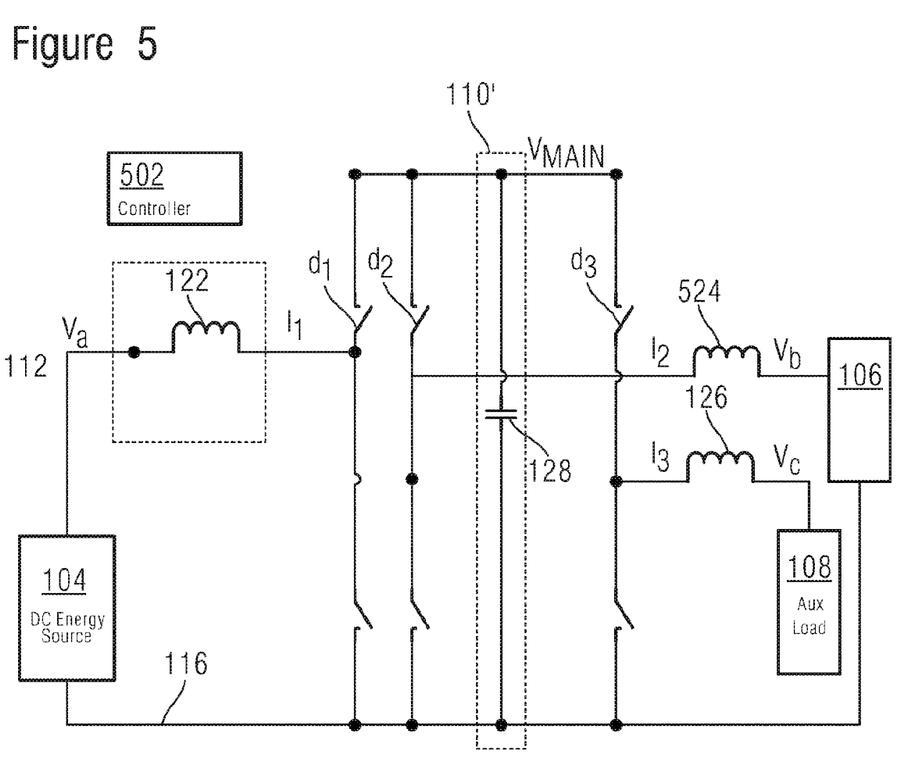
FIG. 5 shows apparatus comprising another DC-to-DC converter.

FIG. 5 shows a DC power supply system comprising a DC-to-DC converter 100, a DC energy source such as a fuel cell, a first load 106, and a second load 108.

The converter 500 comprises an input 112, a main output 110, an auxiliary output 114, a reference voltage input/output 116, and a controller 502.

The DC energy source 104 is connected between the input of the DC-to-DC converter 100 and the reference voltage input/output 116. The first load 106 is connected between a first output of the converter 100 and the reference voltage input/output 116. The second load 108 is connected between the auxiliary output 114 of the converter 100 and the reference voltage input/output 116. The DC energy source 104 is operable to provide an input voltage $V_a$ at the input of the converter 100.

The converter 100 comprises a switching bridge 120, a first inductor 122, a second inductor 524, a third inductor 126, and a capacitor 128. The converter 100 also comprises a main voltage coupling 110' and a reference voltage coupling 116' for connection to the reference voltage input/output 116. The switching bridge comprises at least three legs which are connected between the main voltage coupling and the reference voltage coupling The main voltage coupling 110' and the reference voltage coupling 116' are connected by the capacitor 128. The switching bridge includes three legs 130, 132, 134 connected across the capacitor 128 between the main output voltage coupling 110 and the reference voltage coupling 116. Each leg comprises a first switching element 140, 142, 144 a second switching element 146, 148, 150, and a mid-connection 152, 154, 156 for connecting to an input or output of the leg. The first switching element 140, 142, 144 in each leg is connected between the mid-connection 152, 154, 156 and the output voltage coupling 110'. The second switching element 146, 148, 150, in each leg is connected between the reference voltage coupling 116' and the mid-connection 152, 154, 156. In each leg, the two switching elements may be arranged to be driven in opposition to each other. For example, when the first switching element is closed (on), the other is off (open) and vice versa.

The mid-connection 152 of the first leg 130 is connected to the input 112 of the converter 100 by the first inductance 122. The mid-connection 154 of the second leg 132 is connected to the first output 112 of the converter 100 by the second inductance 524. The mid-connection 156 of the third leg 134 is connected to the auxiliary output 114 of the converter 100 by the third inductor 126.

The first inductor 122, the second inductor 524, and the third inductor 126 are operable to store electrical energy in a magnetic field associated with the passage of current through them. The first inductor 122 is operable to provide a first current $I_1$ to the mid-connection 152 of the first leg 130 by drawing current from the converter input 112 in response to operation of the switching elements 140, 146 of the first leg. The first inductor 122 thereby acts as an inductive energy store for a boost stage of the DC-to-DC-converter 100 illustrated in FIG. 5. And, the first leg 130 provides a boost stage switch—e.g. the switching function of a boost stage of the converter 100. By operation of the switches 140, 146 of the boost stage leg 130 the converter 500 can provide the main voltage, $V_{MAIN}$ for supply to the capacitor, and the other two legs of the inverter.

The second inductor 524 is operable to provide a voltage $V_b$ at the first output of the converter based on a second current $I_2$ provided by the mid-connection 154 of the second leg in response to operation of the switching elements 142, 148 of the second leg of the switching bridge 120. The third inductor 126 is operable to draw a third current $I_3$ from the mid-connection 156 of the third leg 134 by drawing current from the main output voltage coupling 110' in response to operation of the switching elements 144, 150 of the third leg. The third inductor is operable to provide an auxiliary output voltage $V_c$ at the converter's auxiliary output.

The controller 102 is coupled to control the switching elements of the switching bridge 120, and to sense the currents $I_1$, $I_2$, and $I_3$. The controller 102 is also coupled to sense the voltages $V_a$, $V_b$, $V_c$, and $V_{MAIN}$. In the interests of clarity in the drawings, not all of the control and sensing couplings of the controller 102 are shown. The controller 502 is configured to provide:
  (i) a first control signal $\delta_1$ to the first switching element 140 of the first leg 130;
  (ii) a second control signal $\delta_2$ to the first switching element 142 of the second leg 132;
  (iii) a third control signal $\delta_3$ to the first switching element 144 of the third leg 134;

The controller 502 may be configured to provide the inverse of the control signals $\delta_1$, $\delta_2$, $\delta_3$ to the second switching element of the first leg, the second leg, and the third leg respectively. It will thus be understood that the first switching element of each leg may be driven in opposition to the second switching element of that leg. The control signals $\delta_1, \delta_2, \delta_3$ may comprise pulse width modulated control signals. In some embodiments, the controller is arranged to control only the first switching element or only the second switching element of each leg and keep the other in an off-state (or optionally to replace it altogether with a free-wheel diode)

Figure 6:
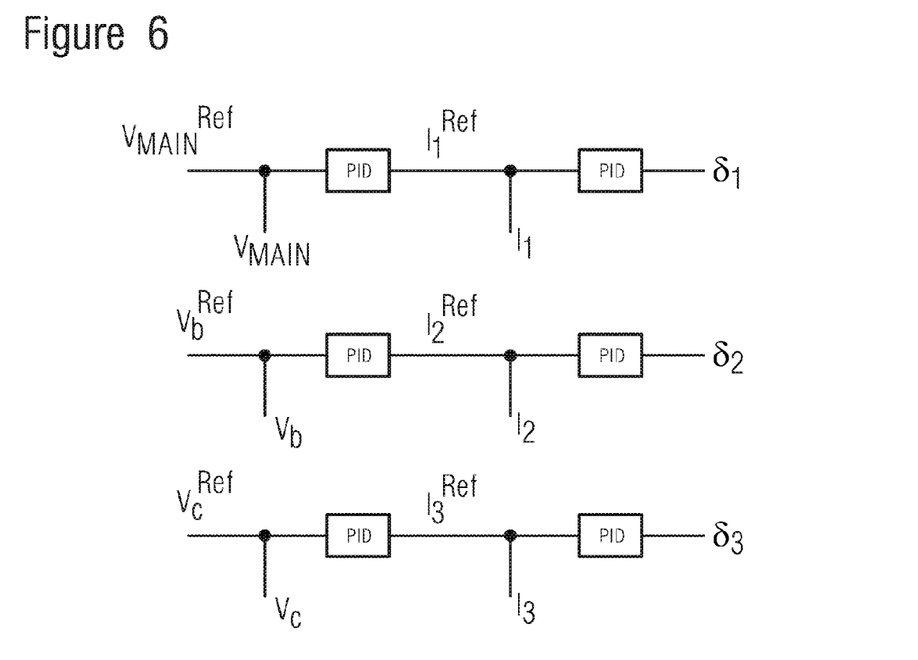
FIG. 6 shows an apparatus comprising a DC-to-DC converter.

In operation, the controller 502 implements the three control loops illustrated in FIG. 6. This may be done using analogue or digital control. In a digital control scheme, the controller implements the three control loops in each of a series of clock cycles. In the first control loop the controller 102 senses the voltage $V_{MAIN}$ and determines the difference between $V_{MAIN}$ and a first target voltage $V_{MAIN}^{Ref}$. Based on this difference it determines the target current $I_1^{Ref}$ which needs to be provided into the capacitor to reduce that difference (e.g. to null the measured error between the actual and target $V_{MAIN}$). This may be done using a proportional-integral-derivative (PID) controller or other appropriate control element.

The controller 102 then determines the difference between the current $I_1$ from the first inductor and the first leg target current $I_1^{Ref}$. It then determines the control signal $\delta_1$ that needs to be applied to the switching elements of the first leg to reduce this difference (e.g. to null the measured error between the actual and target $I_1$). This may be done using a PID controller or other appropriate control element, as will be appreciated in the context of the present disclosure such a control element may be configured to determine the $\delta_1$ signal (e.g. in the form of PWM pulses) using spread-spectrum or other frequency dithering methods. The controller 102 then applies the control signal $\delta_1$ to the switching elements of the first leg.

In the second control loop, the controller 502 senses the voltage $V_b$ and determines the difference between $V_b$ and a second target voltage $V_b^{Ref}$. Based on this difference it determines the target current, $I_2^{Ref}$, which needs to be provided into the second inductor to reduce that difference (e.g. to null the measured error between the actual $V_b$ and the target $V_b^{Ref}$). This may be done using another PID controller or other appropriate control element. It then senses the actual current $I_2$ being provided to the third inductor and determines the difference between this actual current $I_2$ and the target current $I_2^{Ref}$. It then determines the control signal $\delta_2$ that needs to be applied to the switching elements of the second leg to reduce this difference (e.g. to null the measured error between the actual and target $I_2$). The controller 102 then applies the control signal $\delta_2$ to the switching elements of the second leg. The third control loop applies equivalent control to the third leg using the control signal $\delta_3$ based on first monitoring the difference between $V_c$ and $V_c^{Ref}$, determining the target current $I_3^{Ref}$ needed to null this difference, and then operating the control signal $\delta_3$ to control the third leg to reduce (e.g. null) the error between this target current and the current from the mid-connection of the third leg to the second inductor.

The controller 102 operates these three control loops concurrently (e.g. in a series of concurrent iterations) to control the voltages $V_b$, $V_c$ and $V_{MAIN}$ to match the target voltages $V_b^{Ref}$, $V_c^{Ref}$ and $V_{MAIN}^{Ref}$ respectively.

These are just some examples of the topologies and control schemes which can be employed in the present disclosure. It will be appreciated in the context of the present disclosure that the term reactive impedance means electrical impedance having an inductive and/or capacitive component. Such impedance may also comprise an ohmic component. The control signals $\delta_1, \delta_2, \delta_3$, have been described as being pulse width modulated, but other modulation schemes and other methods of controlling the switches may be used.

It will also be appreciated that although the vehicle illustrated in FIG. 1 is a lift truck. Although the present disclosure is of particular utility in such vehicles, this is just an example and embodiments of the disclosure may be used in any type of vehicle, including all types of on-highway and off-highway vehicle.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. The controller may comprise an analogue control circuit which provides at least a part of this control functionality—for example, a suitably configured error amplifier, a ramp generator circuit, and comparator can be arranged to generate pulse width modulated control signals $\delta_1, \delta_2, \delta_3$. An embodiment provides an analogue control circuit configured to perform any one or more of the methods described herein.

The invention claimed is:

1. A DC-to-DC converter apparatus comprising:
    an input for connection to a DC power supply to be converted;
    an input inductive energy store,
    a capacitive energy store,
    a reference voltage connection, and
    an inverter suitable for providing AC electrical power for controlling an electric traction motor, wherein the inverter comprises a plurality of switching legs wherein each switching leg of the inverter is arranged for switching a DC voltage to provide an electrical signal of the AC electrical power, wherein at least one switching leg of the inverter is arranged to provide a boost stage switch comprising:
        a first coupling connected to the reference voltage connection,
        a second coupling connected to an output of the inductive energy store, and a third coupling, and
    wherein the capacitive energy store is connected between the third coupling and the reference voltage connection and the input inductive energy store is connected between the input and the second coupling;
    the DC-to-DC converter further comprising a controller, configured to operate the switch based on a boost voltage difference between:
        (i) the voltage, $V_b$, between the third coupling and the reference voltage connection; and
        (ii) a boost target voltage, $V_b^{Ref}$.

2. The apparatus of claim 1 wherein the at least one switching leg of the boost stage switch comprises a first switching leg and a second switching leg arranged in parallel with each other between the first coupling and the third coupling.

3. The apparatus of claim 2 wherein the second coupling comprises:
    a first connection between two switches of the first switching leg, the two switches of the first switching leg being connected in series by said first coupling, and
    a second connection between two switches of the second switching leg, the two switches of the second switching leg being connected in series by said second coupling.

4. The apparatus of claim 3 wherein the input inductive energy store comprises a first inductor connected between the input and the first connection, and a second inductor connected between the input and the second connection.

5. The apparatus of claim 4 wherein the first inductor and the second inductor are in parallel between the input and the second coupling.

6. The apparatus of claim 2, wherein the controller is configured to operate the first switching leg to provide a first current from the input inductive energy store, and to operate the second switching leg to provide a second current from the input inductive energy store, and to control the first current and the second current based on the boost voltage difference.

7. The apparatus of claim 1 comprising,
    a buck stage switch comprising a first coupling connected to the reference voltage connection, a second coupling connected to an output inductive energy store, and a third coupling, wherein the capacitive energy store is connected between the third coupling of the buck stage switch and the reference voltage connection.

8. A method of controlling an electric motor inverter, the inverter suitable for providing AC electrical power for controlling an electric traction motor, wherein the inverter comprises a plurality of switching legs wherein each switching leg of the inverter is arranged for switching a DC voltage to provide an electrical signal of the AC electrical power, wherein the electric motor inverter is adapted to provide a DC-to-DC converter,
    the method comprising:
        obtaining a first difference signal indicating a boost voltage difference between a target boost voltage and a DC voltage across the inverter;
        determining a target current to be provided to a capacitor connected across the inverter to reduce the first voltage difference;

obtaining a second difference signal indicating a first current difference between:
(i) the target current; and
(ii) current flowing between a first input inductor and a mid-connection of a first boost leg of the inverter; and, operating the first boost leg of the inverter to reduce the first current difference.

9. The method of claim 8 in which the first input inductor is coupled between a DC supply input and the mid-connection of the first boost leg, and a second input inductor is coupled between a mid-connection of a second boost leg of the inverter and the DC supply input, the method comprising:
determining a second target current $I_2^{Ref}$ to be provided from the second boost leg of the inverter to the capacitor to reduce the first voltage difference; and
operating the second boost leg of the inverter to reduce the difference between:
(i) the target current $I_2^{Ref}$; and
(ii) current $I_2$ flowing between the second input inductor and a mid-connection of a second boost leg of the inverter.

10. The method of claim 8 comprising,
obtaining a third difference signal indicating a buck voltage difference between a target buck voltage and a voltage at a buck output of the converter,
wherein the buck output is coupled to a mid-connection of a buck leg of the inverter by a first output inductor; and
operating the buck leg of the inverter to reduce the buck voltage difference, wherein operating the buck leg comprises determining a target buck current to be provided in the first output inductor to reduce the buck voltage difference, and wherein operating the buck leg comprises determining a second current difference between:
(i) the target buck current; and
(ii) current flowing between the first output inductor and the mid-connection of the buck leg of the inverter; and, operating the buck leg to reduce the second current difference.

11. A computer program product comprising program instructions configured to program a programmable controller to perform the method of claim 9.

12. A controller for controlling an inverter, wherein the controller is configured to perform the method of claim 9.

13. An analogue control circuit configured to perform the method of claim 9.

14. A DC power supply system for a materials handling vehicle such as a lift truck, the system comprising:
a main power supply circuit; and
an auxiliary power supply circuit arranged to provide DC power at lower voltage than the main power supply circuit;
an inverter, and a controller configured to operate the inverter, and to:
obtain a first difference signal indicating a boost voltage difference between a target boost voltage and a DC voltage across the inverter, wherein the DC voltage across the inverter is connected to a boost output to provide DC electrical power to the main power supply circuit;
determine a target current to be provided to a capacitor connected across the inverter to reduce the first voltage difference;
operate a first boost leg of the inverter to reduce a first current difference between:
(i) the target current $I_1^{Ref}$; and
(ii) current, $I_1$, flowing between a first input inductor and a mid-connection of a first boost leg of the inverter; and, to operate a buck leg of the inverter to reduce a buck voltage difference between:
(i) a target buck voltage; and
(ii) a voltage at a buck output of the converter,
wherein the buck output is arranged to provide DC electrical power to the auxiliary power circuit and is coupled to a mid-connection of a buck leg of the inverter by a first output inductor.

15. The system of claim 14 wherein the controller is configured to determine a target buck current to be provided in the first output inductor to reduce the buck voltage difference, and wherein operating the buck leg comprises operating the buck leg to reduce the difference between:
(i) the target buck current $I_3^{Ref}$; and
(ii) current, $I_3$, flowing between the first output inductor and the mid-connection of the buck leg of the inverter.

16. The system of claim 14 in which the first input inductor is coupled between a DC supply input and the mid-connection of the first boost leg, and a second input inductor is coupled between a mid-connection of a second boost leg of the inverter and the DC supply input, and the controller is configured to:
determine a second target current $I_2^{Ref}$ to be provided from the second boost leg of the inverter to the capacitor to reduce the first voltage difference; and
operate the second boost leg of the inverter to reduce the difference between:
(i) the target current $I_2^{Ref}$; and
(ii) current $I_2$ flowing between the second input inductor and a mid-connection of a second boost leg of the inverter.

17. A method of controlling an inverter to provide a buck-boost DC-to-DC converter for a materials handling vehicle, the method comprising:
obtaining a first difference signal indicating a boost voltage difference between a target boost voltage and a DC voltage across the inverter;
determining a target current to be provided to a capacitor connected across the inverter to reduce the first voltage difference;
operating a first boost leg of the inverter to reduce a first current difference between:
(i) the target current $I_1^{Ref}$; and
(ii) current, $I_1$, flowing between a first input inductor and a mid-connection of a first boost leg of the inverter; and,
operating a buck leg of the inverter to reduce a buck voltage difference between:
(i) a target buck voltage; and
(ii) a voltage at a buck output of the converter,
wherein the buck output is coupled to a mid-connection of a buck leg of the inverter by a first output inductor.

18. The method of claim 17 wherein operating the buck leg comprises determining a target buck current to be provided in the first output inductor to reduce the buck voltage difference.

19. The method of claim 18 wherein operating the buck leg comprises operating the buck leg to reduce the difference between:
(i) the target buck current; and
(ii) current flowing between the first output inductor and the mid-connection of the buck leg of the inverter.

20. The method of claim 17 in which the first input inductor is coupled between a DC supply input and the mid-connection of the first boost leg, and a second input inductor is coupled between a mid-connection of a second boost leg of the inverter and the DC supply input, the method comprising:
- determining a second target current $I_2^{Ref}$ to be provided from the second boost leg of the inverter to the capacitor to reduce the first voltage difference; and
- operating the second boost leg of the inverter to reduce the difference between:
  - (i) the target current $I_2^{Ref}$; and
  - (ii) current $I_2$ flowing between the second input inductor and a mid-connection of a second boost leg of the inverter.

* * * * *